US012782490B2

(12) United States Patent
Baker

(10) Patent No.: US 12,782,490 B2
(45) Date of Patent: Nov. 3, 2026

(54) ANGLE-OF-ARRIVAL DETECTION USING A DUAL-CORE BLUETOOTH RECEIVER

(71) Applicant: Avago Technologies International Sales Pte. Limited, Singapore (SG)

(72) Inventor: Thomas Francis Baker, Dana Point, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/482,046

(22) Filed: Oct. 6, 2023

(65) Prior Publication Data

US 2024/0036145 A1 Feb. 1, 2024

Related U.S. Application Data

(63) Continuation of application No. 16/653,889, filed on Oct. 15, 2019, now Pat. No. 11,815,611.

(51) Int. Cl.
*G01S 3/48* (2006.01)
*G01S 5/02* (2010.01)
(Continued)

(52) U.S. Cl.
CPC .............. *G01S 3/48* (2013.01); *G01S 5/0231* (2013.01); *G01S 5/0242* (2013.01);
(Continued)

(58) Field of Classification Search
CPC . G01S 3/48; G01S 5/04; G01S 5/0231; G01S 5/0242; G01S 5/0289; H04W 4/33; H04W 4/80; H04L 67/52
See application file for complete search history.

(56) References Cited

U.S. PATENT DOCUMENTS 5,389,936 A 2/1995 Alcock
10,698,070 B2 * 6/2020 Park ........................ H04W 4/40
(Continued)

FOREIGN PATENT DOCUMENTS

CN 108075784 A 5/2018
CN 1097979403 A 5/2018
CN 108282198 A 7/2018

OTHER PUBLICATIONS

Haynes, Tony, "A Primer on Digital Beamforming", Spectrum Signal Processing, Mar. 26, 1998 (Year: 1998).*
(Continued)

*Primary Examiner* — Cassi J Galt
(74) *Attorney, Agent, or Firm* — Foley & Lardner LLP

(57) ABSTRACT

A system for detecting angle-of-arrival (AoA) includes a first device and at least one second device. The first device transmits a Bluetooth (BT) packet, and the second device receives the BT packet and determines an AoA of the BT packet. The second device includes a first radio-frequency (RF) antenna to receive a first RF signal and a second RF antenna to receive a second RF signal. The second device also includes a first BT core and a second BT-core and a processing circuit. The first BT core is coupled to the first RF antenna and is used to generate a first signal based on the first RF signal. The second BT core is coupled to the second RF antenna and generates a second signal based on the second RF signal. The processing circuit measures a phase difference between the first signal and the second signal and determines the AoA based on the phase difference.

20 Claims, 8 Drawing Sheets

(51) Int. Cl.
*G01S 5/04* (2006.01)
*H04L 67/52* (2022.01)
*H04W 4/33* (2018.01)
*H04W 4/80* (2018.01)

(52) U.S. Cl.
CPC .............. *G01S 5/0289* (2013.01); *G01S 5/04* (2013.01); *H04L 67/52* (2022.05); *H04W 4/33* (2018.02); *H04W 4/80* (2018.02)

(56) References Cited

U.S. PATENT DOCUMENTS

2011/0281539 A1 11/2011 Yamada
2013/0321209 A1* 12/2013 Kalliola ................ G01S 13/825 342/419
2018/0115439 A1 4/2018 Bhatti et al.
2018/0132192 A1 5/2018 Yang et al.
2018/0267131 A1* 9/2018 Simileysky ........... H04W 4/026
2019/0373592 A1 12/2019 Ji et al.

OTHER PUBLICATIONS

Notice of Allowance on U.S. Appl. No. 16/653,889 DTD Jul. 18, 2023.
Zekavat, Seyed A. and R. Michael Buehrer, "Handbook of Position Location", IEEE Press, Inc., 2012 (Year: 2012).
Foreign Action other than Search Report on non-Foley case related to US DTD Dec. 25, 2024.
Foreign Action other than Search Report on non-Foley case related to US DTD May 7, 2025.
Zhang Xiaotong, et al., "Wireless Sensor Networks and Artificial Life," National Defence Industry Press, pp. 58-60.
Chinese Office Action on Chinese Patent Appln. No. CN202010745628.X, dated Aug. 1, 2025.

* cited by examiner

800

ANGLE-OF-ARRIVAL DETECTION USING A DUAL-CORE BLUETOOTH RECEIVER

RELATED APPLICATIONS

This patent application is a continuation of, and claims priority to and the benefit of U.S. patent application Ser. No. 16/653,889, titled “ANGLE-OF-ARRIVAL DETECTION USING A DUAL-CORE BLUETOOTH,” and filed Oct. 15, 2019, the contents of all of which are hereby incorporated herein by reference in its entirety for all purposes.

TECHNICAL FIELD

The present description relates in general to wireless communications, more particularly, for example, without limitation, to angle-of-arrival detection using a dual-core Bluetooth receiver.

BACKGROUND

The Bluetooth low energy (BLE) standard can be used to detect angle-of-arrival (AoA) of signals from a Bluetooth (BT)-enabled device. In a BLE standard implementation, a special hardware (chip) is required in both the BT-enabled device and the AoA-detecting platform to establish a direction finding link. The direction finding link has to follow a standard protocol, and thus can only be used with specific devices. Further, an external switch is needed in order to flip between two or more antennas in the AoA-detecting platform.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to angle-of-arrival (AoA) detection using a dual-core Bluetooth (BT) receiver. The device of the subject technology has two antennas and uses two BT cores to compute the AoA for packets received from a BT-enabled device. Each BT core is connected to an antenna, and the BT link is established with the BT-enabled device as it normally would be with a single antenna. This subject technology leverages maximal ratio combining (MRC) to compute the magnitude and phase difference between the two incoming signals received by the two BT cores. Based on the orientation of the two antennas, the AoA of the signals from the BT-enabled device can be estimated by using the phase difference between the signals received on the two antennas.

In some aspects, the disclosed AoA-detection features can be implemented by using an off-chip antenna switch that flips between two antennas on one BT core, while continually receiving a reference signal on one of the BT cores. In other aspects, the subject AoA-detection features can be implemented by using two antenna switches to flip between multiple antennas on both cores simultaneously to increase the number of samples and to achieve better angle estimations.

The subject technology has a number of advantageous features, as compared to the existing solution. For example, the disclosed dual-core receiver does not need any special packet extension and does require any protocol to be followed. In other words, the disclosed technology is not limited to any packet type and can be used with any of the low-energy rates (e.g., 2 Mbps, 1 Mbps), all long-range rates, BT-basic-data rates, BT-enhanced data rates or other custom supported packet types. The features of the subject technology can be used in applications involving finding other BT devices. For example, a key, such as a car key that includes a BT transmitters can be found by running an application on a handheld communication device (e.g., a smartphone, a tablet or a smartwatch). The application can point to the direction of the key and help find the key.

Figure 1:
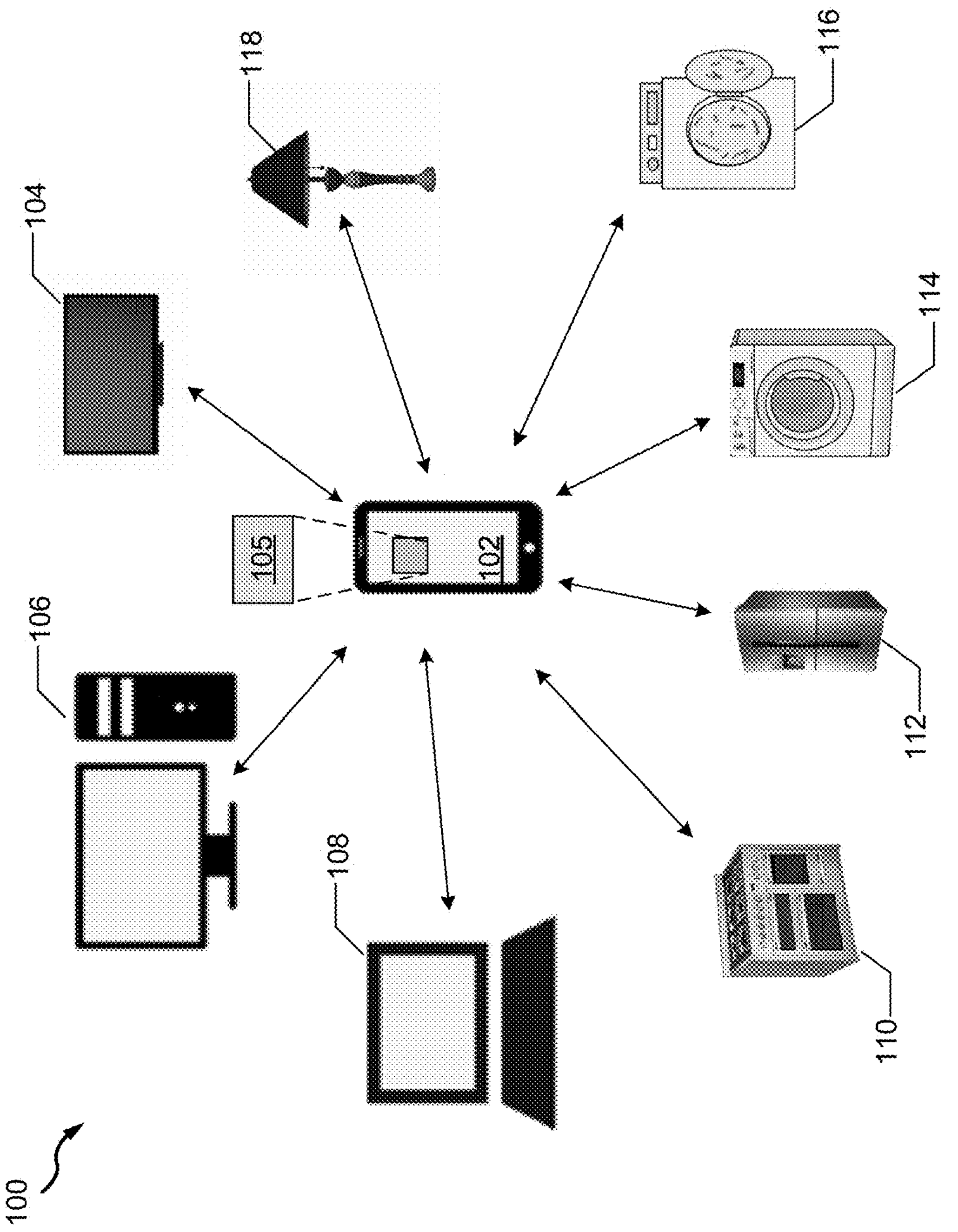
FIG. 1 is a schematic diagram illustrating an example of a home environment in which an angle-of-arrival (AoA)-detection device of the subject technology can be used.

FIG. 1 is a schematic diagram illustrating an example of a home environment 100 in which an AoA-detection device of the subject technology can be used. The home environment 100 includes a number of consumer electronic devices and appliances such as a handheld communication device 102 (e.g., a smartphone, a smartwatch, a tablet or a laptop computer), a television (TV) 104 (e.g., a smart TV), a computer 106 (e.g., a desktop), a laptop 108, a range 110, a refrigerator 112, a washing machine 114, a dryer 116 and a lamp 118. The consumer electronic devices and appliances are BT enabled, for example, BT low energy (BLE)-enabled.

The handheld communication device 102 (hereinafter, “device 102”) includes an AoA-detection device of the subject technology such as an AoA-detection chip 105. The device 102 also includes a number of applications running on the device. Each application is associated with one of the consumer electronic devices and appliances of the home environment 100. For example, specific remote control applications for each of the TV 104, the computer 106, the laptop 108, the range 110, the refrigerator 112, the washing machine 114, the dryer 116 and/or the lamp 118. The device 102 includes two or more (radio-frequency) RF antennas and two BT cores coupled to two of the RF antennas. The first BT core is coupled to the first RF antenna and is used to generate a first signal based on the first RF signal. The second BT-core is coupled to the second RF antenna and generates a second signal based on the second RF signal. The processing circuit measures a phase difference between the first signal and the second signal and determines the AoA based on the phase difference. In some implementations, the first signal and the second signal are intermediate frequency (IF) signals generated by using an LO signal provided by an LO circuit. In one or more implementations, the first signal and the second signal are direct current (DC) signals generated by using the LO signal.

In some implementations, the AoA-detection chip 105 can include a processor circuit that can measure a phase difference between the first signal and the second signal and determine the AoA based on the measured-phase difference. In one or more implementations, the AoA-detection chip 105 can pass the measured phase difference between the first signal and the second signal to a host processor, for example, a processor of a phone or embedded in a car that can compute the AoA based on the measured-phase difference. When the user of the device 102 points it to an apparatus of the consumer electronic devices and appliances of the home environment 100, for example, the TV 104, the AoA-detection chip 105 determines that the apparatus pointed to is the TV 104 and activates the application associated with the TV 104, which would need a remote control for the TV 104.

In some aspects, the device 102 can include an off-chip antenna switch that flips between two antennas on one BT core, while continually receiving a reference signal on one of the BT cores. In other aspects, the device 102 can include two antenna switches to switch between multiple antennas on both cores simultaneously to increase the number of samples and to achieve better angle estimations.

Figure 2:
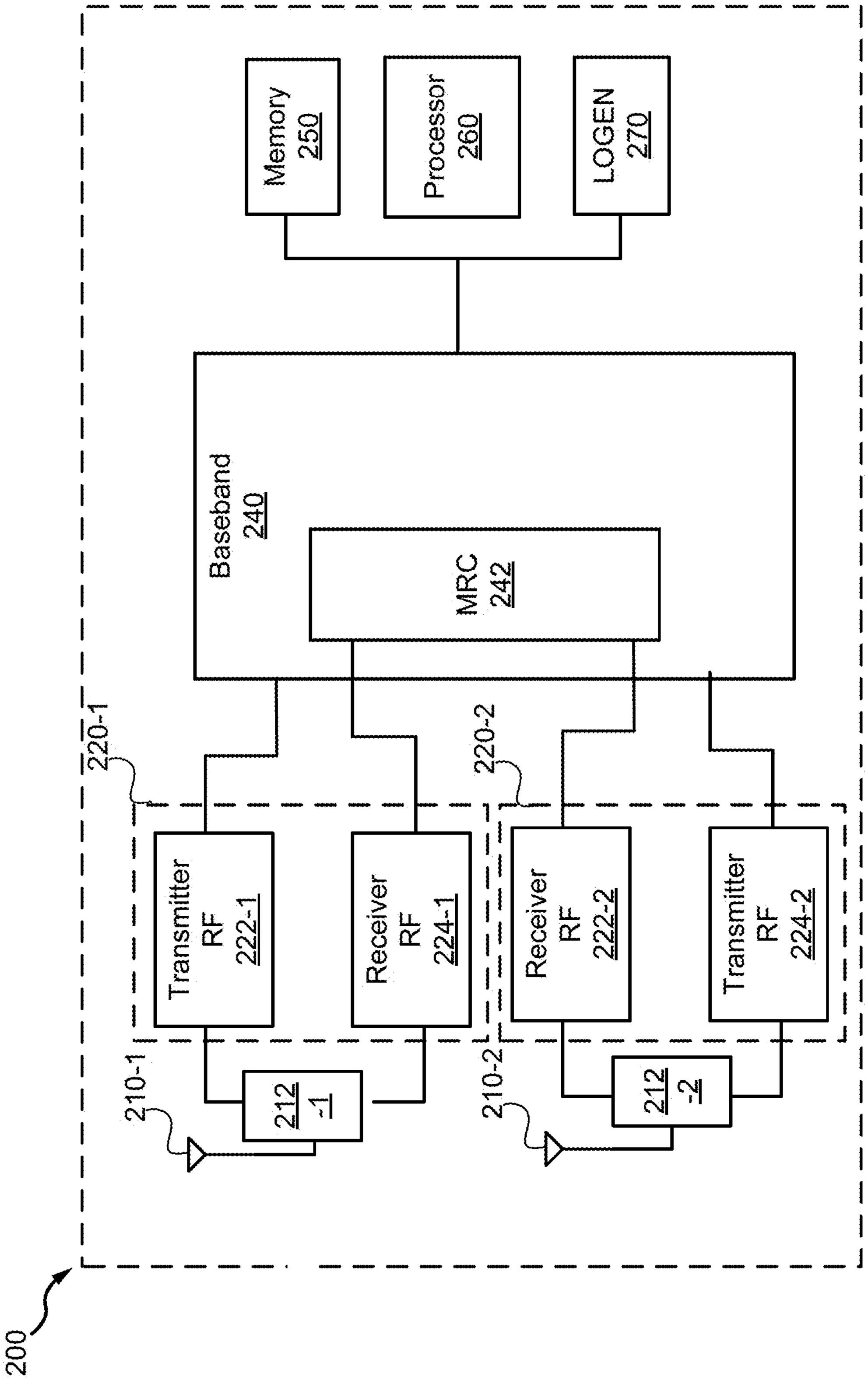
FIG. 2 is a schematic diagram illustrating an example of a system for AOA detection using a dual-core Bluetooth receiver, in accordance with one or more implementations of the subject technology.

FIG. 2 is a schematic diagram illustrating an example of a system 200 for AOA detection using a dual-core BT receiver, in accordance with one or more implementations of the subject technology. The example system 200, as shown in FIG. 2, is a wireless communication device such as the device 102 of FIG. 1, and includes RF antennas 210 (210-1 and 210-2), duplexers 212 (212-1 and 212-2), BT cores 220 (220-1 and 220-2), baseband circuit 240, memory 250, a processor 260 and a local-oscillator generator (LOGEN) 270. The BT cores 220 include transmitters 222 (222-1 and 222-2) and receivers 224 (224-1 and 224-2) and are coupled to the RF antennas via duplexers 212. The receiver 224 may include suitable logic circuitry and/or code that may be operable to receive and process RF signals from the RF antennas 210. The receiver 224 may, for example, be operable to amplify and/or down-convert received RF signals. In various embodiments of the subject technology, the receivers 224 may be operable to cancel noise in received signals and may be linear over a wide range of frequencies.

The baseband circuit 240 may include suitable logic, circuitry, interfaces, and/or code that may be operable to perform processing of baseband signals. The baseband circuit 240 may, for example, analyze received signals and generate control and/or feedback signals for configuring various components of the wireless communication device, such as the receivers 224. The baseband circuit 240 may be operable to encode, decode, transcode, modulate, demodulate, encrypt, decrypt, scramble, descramble, and/or otherwise process data in accordance with one or more wireless standards. In some implementations, the baseband circuit 240 includes a processing circuit 242, such as a maximum-ratio combining circuit (MRC).

When a BT-enabled device that is within the range of the device 102 transmits a BT packet, the first antenna 210-1 receives a first RF signal and the second antenna 210-2 receives a second RF signal. The receivers 224-1 and 224-2 can generate a first and a second signal based on the first RF signal and the second RF signal, respectively. The first and second signals are processed by a processing circuit 242, which can produce two magnitudes and an optimal phase difference between the first and second signals. The processing circuit 242 can process the two magnitudes and the optimal phase difference to determine the AoA of the BT packet, as explained in more detail herein. The determined AoA can then be used in a variety of applications, an example of which was described with respect to FIG. 1, which allowed activating an application associated with a BT-enabled apparatus of a home environment (e.g., 100 of FIG. 1) on the device 102 by pointing the device 102 to that apparatus. Other applications of the subject technology include direction finding and location detection, which are described in more detail below.

The memory 250 may include suitable logic, circuitry, and/or code that may enable storage of various types of information, such as received data, generated data, code, and/or configuration information. The memory 250 may include, for example, RAM, ROM, flash, and/or magnetic storage. In various embodiments, of the subject technology, information stored in the memory 250 may be utilized for configuring the receivers 224 and/or the baseband circuit 240.

The processor 260 may include suitable logic, circuitry, and/or code that may enable processing data and/or controlling operations of the system 200. In this regard, the processor 260 may be enabled to provide control signals to various other portions of the system 200. The processor 260 may also control transfers of data between various portions of the system 200. Additionally, the processor 260 may enable implementation of an operating system or otherwise execute code to manage operations of the system 200.

The local oscillator generator (LOGEN) 270 may include suitable logic, circuitry, interfaces, and/or code that may be operable to generate one or more oscillating signals of one or more frequencies. The LOGEN 270 may be operable to generate digital and/or analog signals. In this manner, the LOGEN 270 may be operable to generate one or more clock signals and/or sinusoidal signals. Characteristics of the oscillating signals such as the frequency and duty cycle may be determined based on one or more control signals from, for example, the processor 260 and/or the baseband circuit 240.

Figure 3:
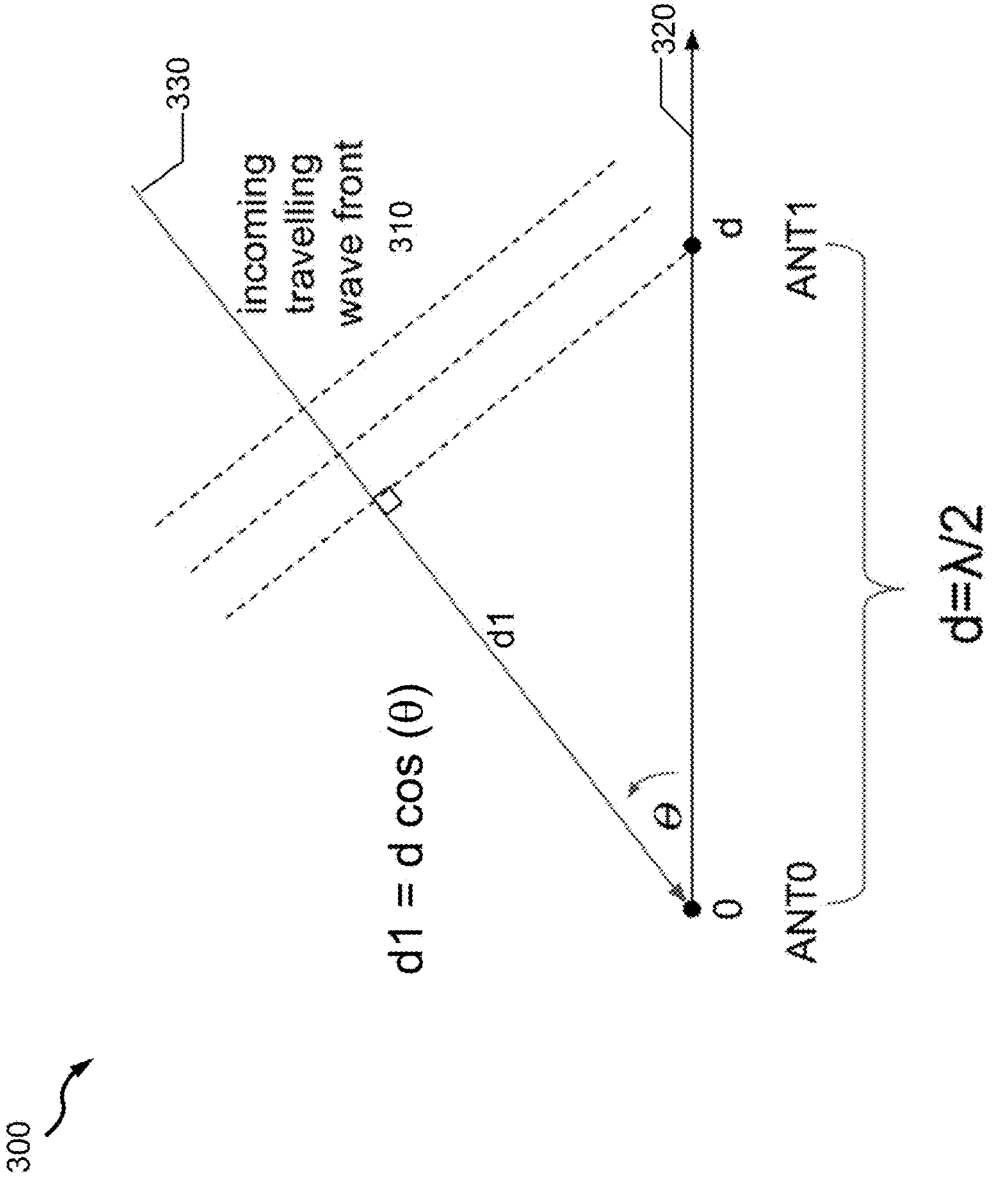
FIG. 3 a schematic diagram illustrating an AoA-determination scheme based on an output phase, in accordance with one or more implementations of the subject technology.

FIG. 3 a schematic diagram illustrating an AoA-determination scheme 300 based on an output phase, in accordance with one or more implementations of the subject technology. In the AoA-determination scheme 300, as shown in FIG. 3, the first and second antennas ANT0 and ANT1 (e.g., 210-1 and 210-2 of FIG. 2) of a communication device (a double BT core, e.g., system 200 of FIG. 2) are at a distance d (equal to $\lambda/2$) from one another, where $\lambda$ is the operating wavelength of the RF signal associated with an incoming travelling wave front 310. The antennas ANT0 and ANT1 are on an axis 320, which is an angle θ with a line 330 that is perpendicular to the direction of the incoming travelling wave front 310. The angle θ is the AoA corresponding to the incoming travelling wave front 310 and can be determined based on a measured phase ϕ between the first and the second signals received by ANT0 and ANT1, as determined by the processing circuit 242 of FIG. 2. The phase ϕ depends on the difference between travelling distances of the travelling waves reaching ANT0 and ANT1, and can be expressed as: $\phi=d1*k$, where k is the wave number that defines the number of radians per unit distance and is given as: $k=2\pi f/c$, with f being the operating frequency and c the speed of light. From FIG. 3, $d1=d\cos(\theta)$, and therefore: $\phi=2\pi fd\cos(\theta)/c$, from which the AoA θ can be expressed as: $\theta=a\cos(\phi c/2\pi fd)$.

Figure 4:
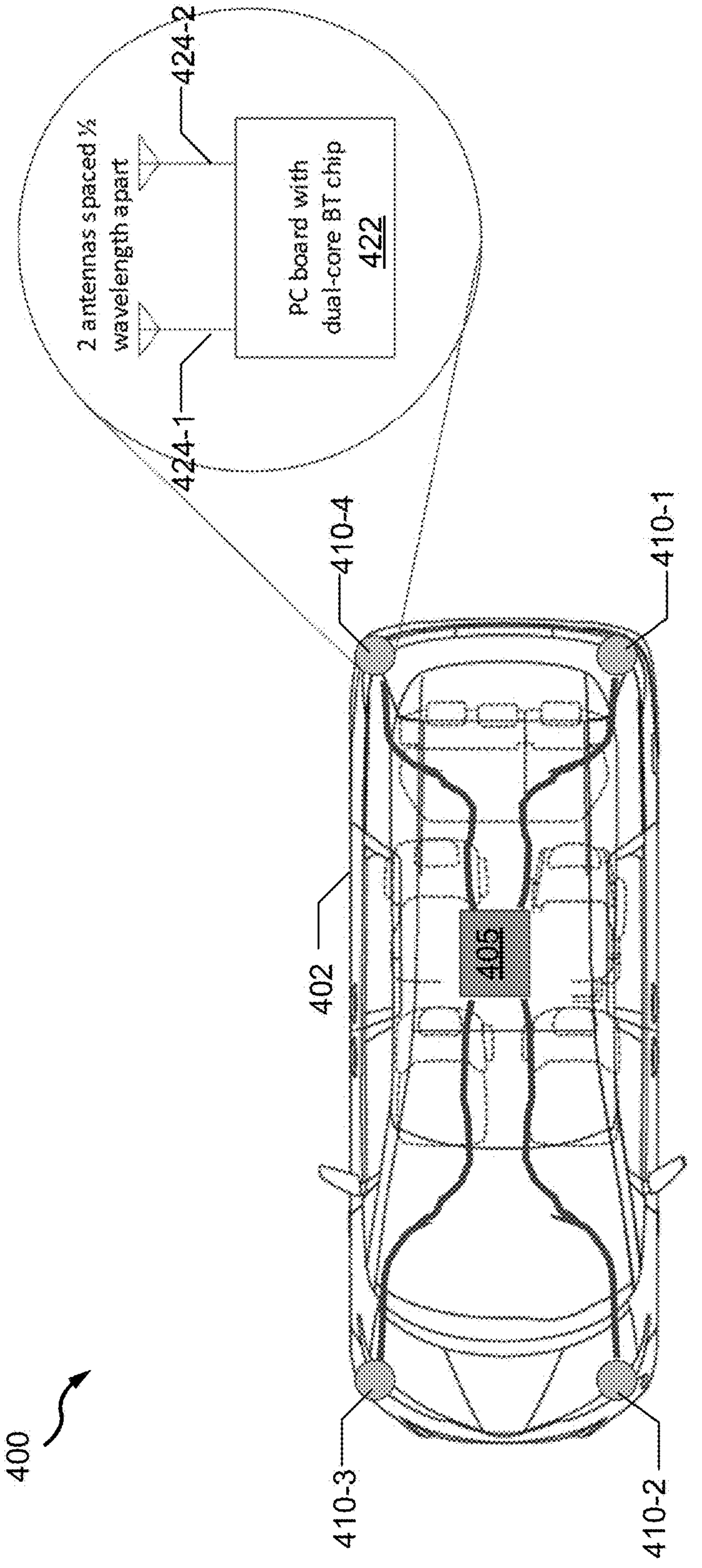
FIG. 4 is a schematic diagram illustrating an example of an automotive environment in which an AoA-detection device of the subject technology can be used.

FIG. 4 is a schematic diagram illustrating an example of an automotive environment 400 in which an AoA-detection device of the subject technology can be used. The automotive environment 400 includes four beacon devices 410 (410-1, 410-2, 410-3 and 410-4), which are installed on four corners of a car 402, and a processing unit 405. The beacon devices 410 are BT enabled and, together with the processing unit 405, are able to detect a location of a BT-enabled device such as a handheld communication device (e.g., a smartphone) outside the car 402, in response to receiving a BT packet from the handheld communication device. Each of the beacon devices 410 include two antennas 424 (424-1 and 424-2), which can receive a first and a second RF signal, respectively, and the dual-core BT chip within a printed circuit (PC) board 422. The dual-core BT chip can generate a first and a second signal based on the first and a second RF signals. The processing unit 405 (e.g., an MRC) can determine the location of the handheld communication device as discussed in more details below.

Figure 5:
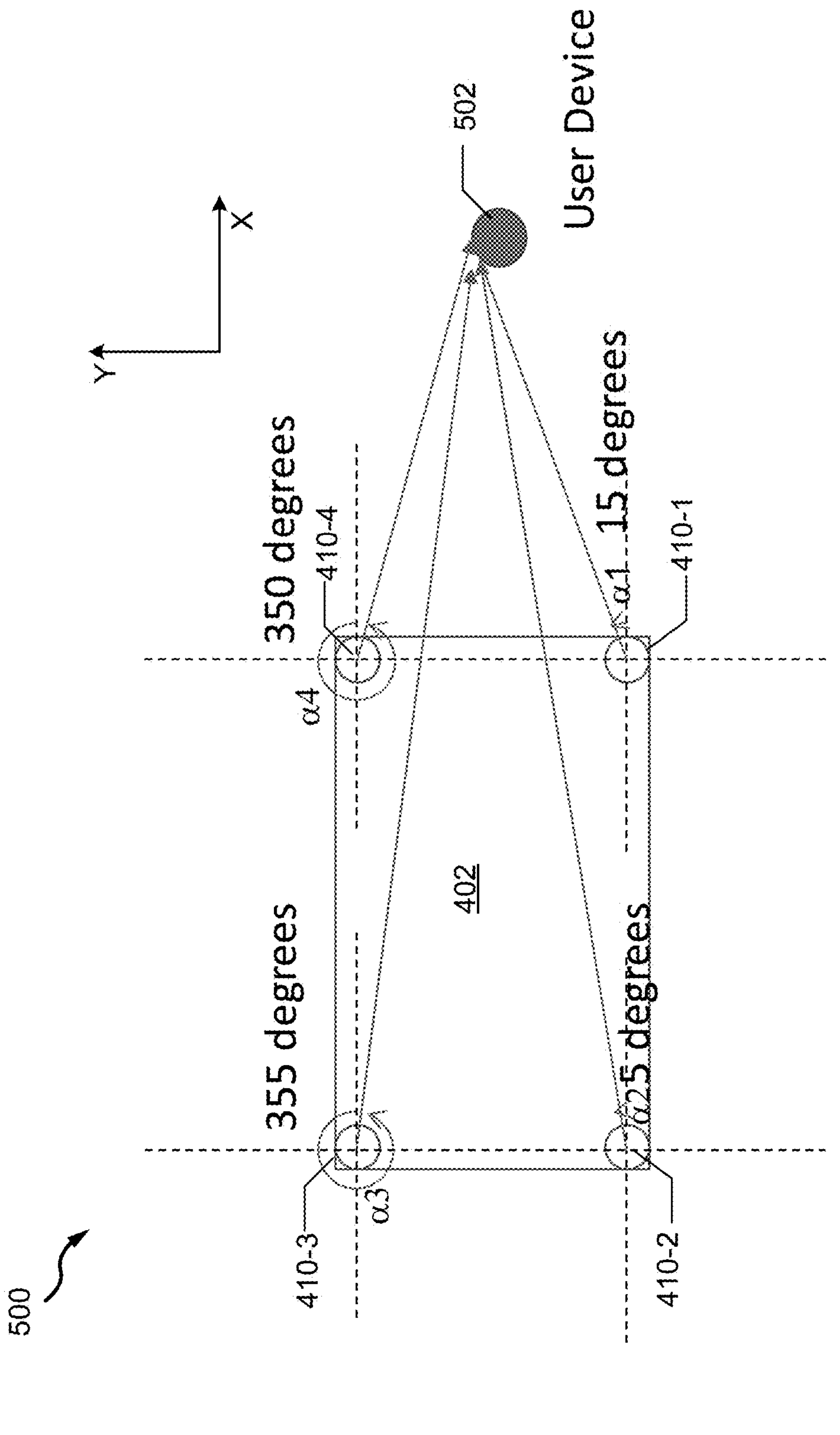
FIG. 5 is a schematic diagram illustrating an example of an automotive application of an AoA detection device, in accordance with one or more implementations of the subject technology.

FIG. 5 is a schematic diagram illustrating an example of an automotive application 500 of an AoA-detection device, in accordance with one or more implementations of the subject technology. The automotive application 500 is related to the automotive environment 400 of FIG. 4 discussed above. The beacon devices 410 (410-1, 410-2, 410-3 and 410-4) are able to receive BT packets from the user device 502 (e.g., a handheld communication device such as a smartphone) when the user device 502 is within BT range of the beacon devices 410. For each beacon device 410, the user device 502 is seen at a different angle, and the BT packet received by that beacon device 410 has a different AoA (e.g., α1, α2, α3, α4). The AoA associated with each beacon device 410 is determined by the processing unit 405 of FIG. 4, based on a phase difference of the RF signals received at the antennas 424 (e.g., 424-1 and 424-2) of FIG. 4, as described with respect to FIG. 3. Example values of α1, α2, α3 and α4 can be 15°, 5°, 355° and 350°, respectively. The processing unit 405 also has the information on locations of the beacon devices 410 and can find the location of the handheld communication device using a triangulation computation based on the known location of the beacon devices 410 and the values of their corresponding AoAs (e.g., α1, α2, α3 or α4).

Figure 6:
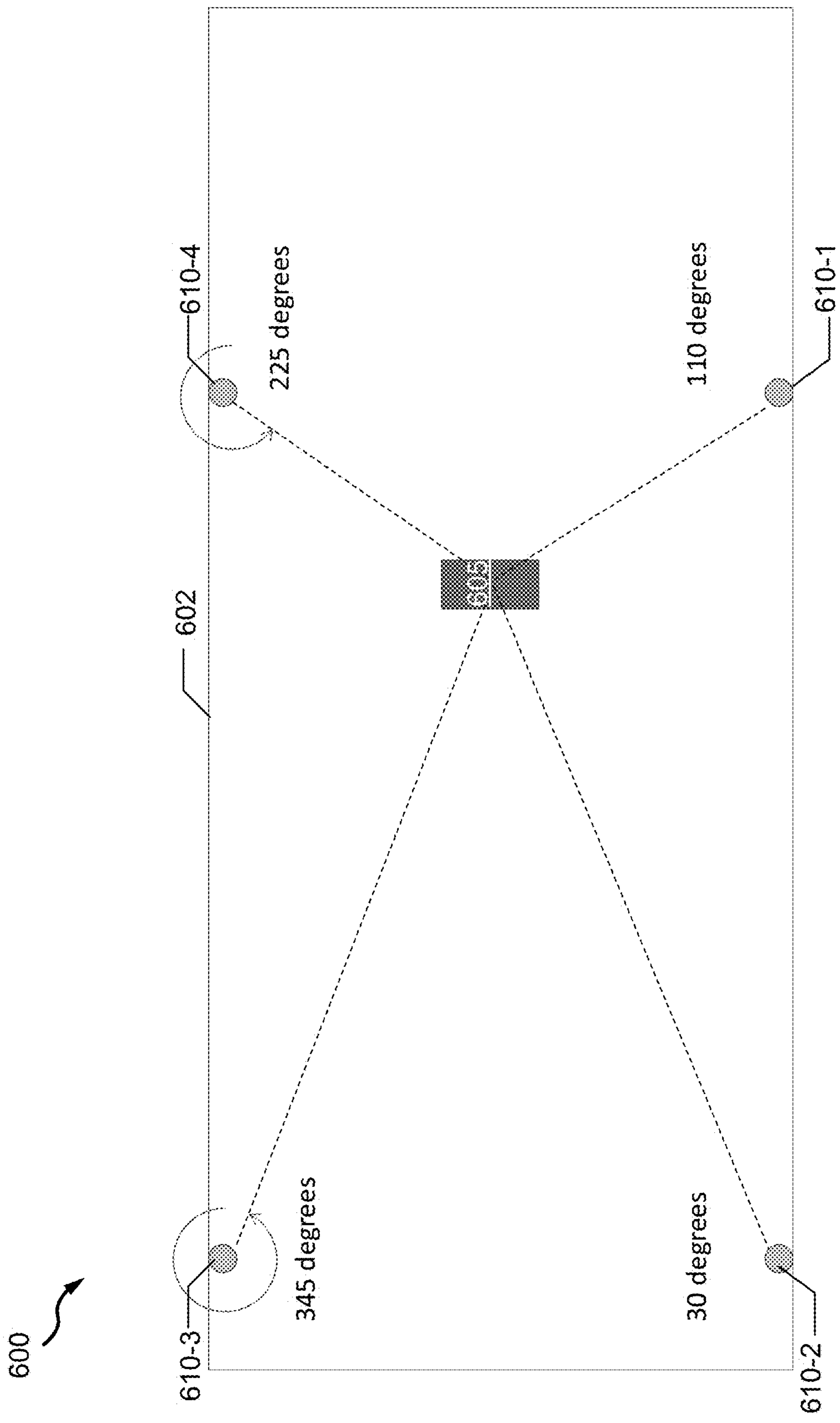
FIG. 6 is a schematic diagram illustrating an example of a position-detection application of an AoA detection device, in accordance with one or more implementations of the subject technology.

FIG. 6 is a schematic diagram illustrating an example of a position-detection application 600 of an AoA-detection device, in accordance with one or more implementations of the subject technology. The position-detection application 600 is related to an indoor environment 602, such as a shopping mall, an enterprise building, a stadium, an airport and the like. A number of beacon devices 610 (e.g., 610-1, 610-2, 610-3, 610-4) are installed on various locations in the indoor environment 602 and are able to receive BT signals from a device 605 (e.g., a handheld communication device, such as a smartphone, a smartwatch or a tablet) with an unknown location within the indoor environment 602. The beacon devices 610 are similar to the beacon devices 410, and each includes two antennas coupled to a dual-BT core, as described above. Each of the beacon devices 610 can detect a corresponding AoA of the BT packets received from the device 605.

The device 605 can request the beacon devices 610 to transmit their corresponding AoA to the device 605. A software application in the device 605 that is associated with the indoor environment 602 knows the location of the beacon devices 610. The device 605 can use the known locations of the beacon devices 610 and their corresponding AoAs to determine its location within the indoor environment 602, using a triangulation computation. The device 605 can display its location on a display, for example, a display of the indoor environment 602. The number of beacon devices is not limited to the number (four) shown in FIG. 6 and can be up to hundreds of beacon devices depending on the size of the indoor environment 602. This allows the user to be able to find their location in an airport or a shopping mall, for example, on a nearby display provided in the airport or the shopping mall.

Figure 7:
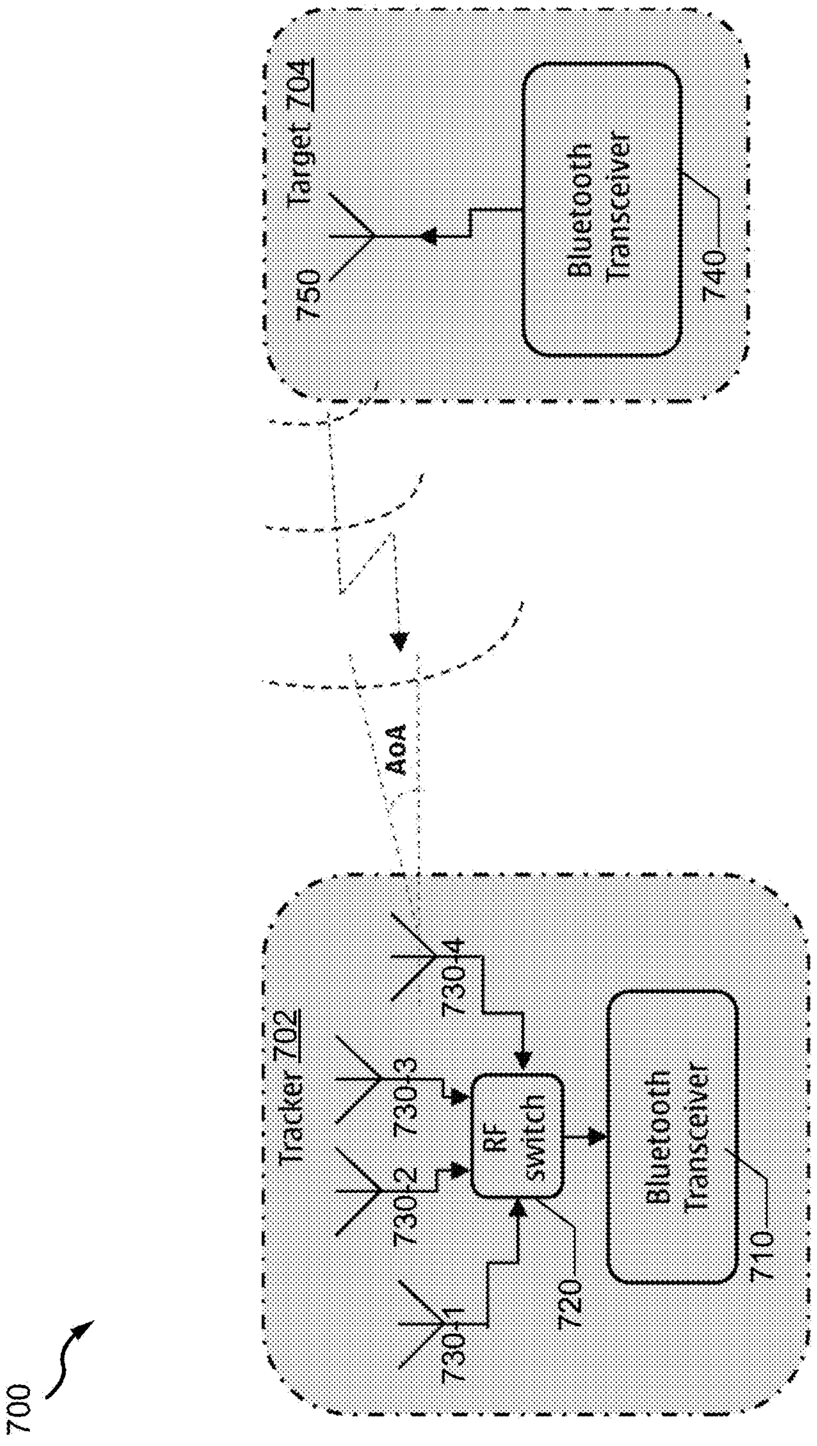
FIG. 7 is a schematic diagram illustrating an example of a system for AOA detection using a single-core BT receiver with multiple antennas.

FIG. 7 is a schematic diagram illustrating an example of a system 700 for AOA detection using a single-core BT receiver with multiple antennas. The system 700 is implemented based on the BLE-direction finding standard and includes a tracker 702 and a target device 704. The tracker 702 includes a single BT core (BT transceiver) 710, an RF switch 720, and multiple antennas 730 (e.g., 730-1, 730-2, 730-3 and 730-4), and the target device 704 includes BT transceiver 740 and an antenna 750. Each antenna receives BT packets from the target device 704 at a different time. The receive time of each BT packet is related to a phase, as described above with respect to FIG. 3, once the distance between the multiple antennas 730 are known. The RF switch can couple each of the antennas 730 to the BT core 710. The BT core 710 can calculate a location of the target device 704 based on the phase differences calculated between signals received at individual antennas.

Figure 8:
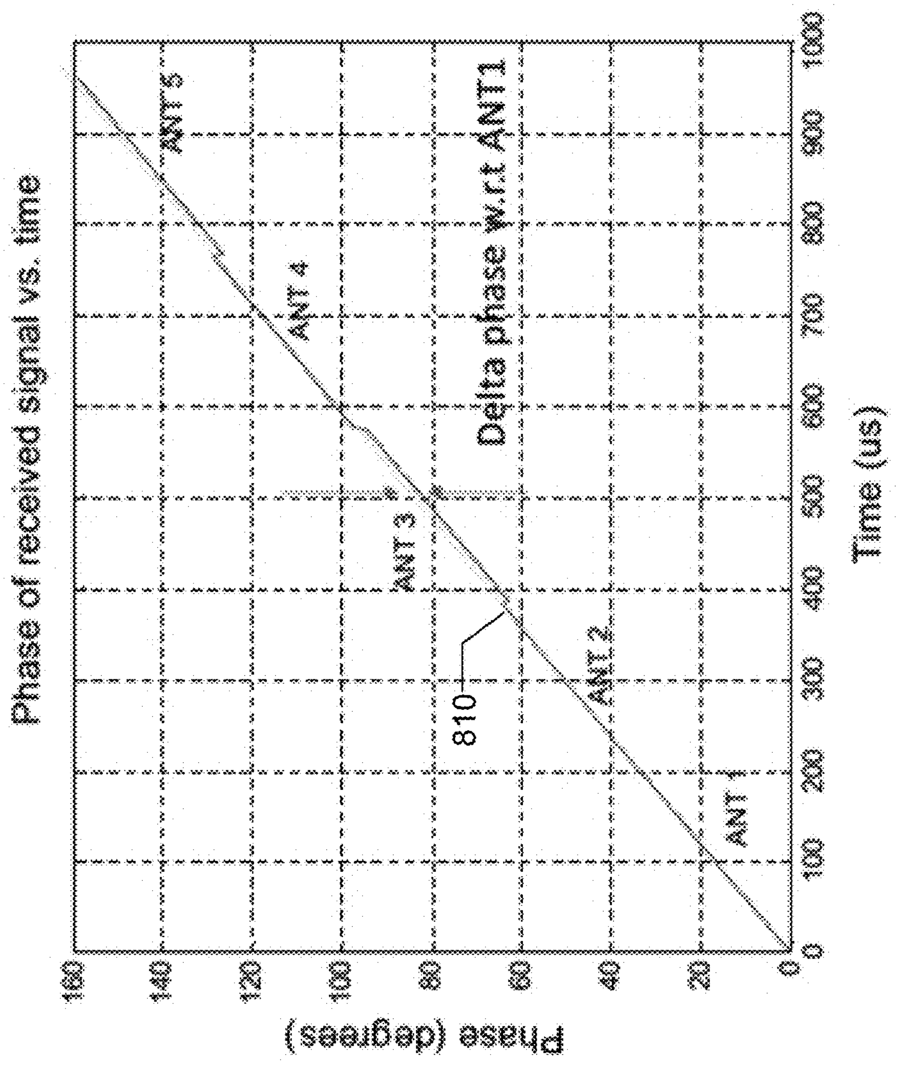
FIG. 8 is a chart illustrating a plot of phase versus time for a single-core BT receiver with multiple antennas, in accordance with one or more implementations of the subject technology.

FIG. 8 is a chart 800 illustrating a plot 810 of phase versus time for a single-core BT receiver with multiple antennas, in accordance with one or more implementations of the subject technology. As described above with respect to FIG. 1, the subject technology can also be implemented using a single core and an antenna array including multiple antennas (e.g., ANT1, ANT2, ANT3, ANT4 and ANT5). For example, the first antenna ANT1 can be used as a reference and the switch is thrown to antenna 2. In a low-IF receiver, the phase of the signal is constantly changing with a fixed rate. Some software can determine the phase from ANT1 and extrapolate it versus time in order to compare the phase of ANT2 with ANT1. This can be done for each antenna in the array. If the initial phase ramp has any error or if the frequency drifts or some other issue causes the phase to deviate from the estimated trajectory shown by the plot 810, the single core receiver can make an error when estimating the phase difference between the cores.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations or one or more configurations. A phrase such as "an aspect" may refer to one or more aspects and vice versa. A phrase such as "a configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "an example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise," as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A system comprising:

a plurality of dual-core Bluetooth (BT) receivers, each dual-core BT receiver installed at a respective location and comprising two BT cores, each of the two BT cores comprising:
  - a transmitter to transmit one or more packets to a device; and
  - a receiver to receive one or more packets from the device; and
  - wherein both the transmitter and the receiver are coupled via a duplexer to a respective antenna different from the respective antenna of another core of a same dual-core BT receiver;

wherein a first BT core of the two BT cores of each dual-core BT receiver is configured to receive, based at least on the one or more packets transmitted from the transmitter of the first BT core to the device, a first radio frequency (RF) signal received by the receiver of the first BT core via the respective antenna of the first BT core;

wherein a second BT core of the two BT cores of each dual-core BT receiver is configured to receive based at least on the one or more packets transmitted from the transmitter of the second BT core to the device, a second RF signal received by the receiver of the second BT core via the respective antenna of the second BT core; and a processing circuitry, coupled to each of the first BT core and the second BT core of each dual-core BT receiver of the plurality of dual-core BT receivers, configured to determine a location of the device using a triangulation computation based at least on a plurality of angles-of-arrival, each angle-of-arrival of the plurality of angles-of-arrival determined by a respective dual-core BT receiver of the plurality of dual-core BT receivers based on a phase difference between the first RF signal and the second RF signal received at the two BT cores of the respective dual-core BT receiver, and the respective location of each dual-core BT receiver.

2. The system of claim 1, wherein the processing circuitry is further configured to determine the phase difference between the first RF signal and the second RF signal received at the two BT cores of each dual-core BT receiver of the plurality of dual-core BT receivers.

3. The system of claim 1, wherein the processing circuitry is further configured to determine each angle-of-arrival of the plurality of angles-of-arrival based on one or more BT packets from the device received at the two BT cores of a respective dual-core BT receiver of the plurality of dual-core BT receivers.

4. The system of claim 1, wherein the first signal and the second signal comprises one of intermediate frequency (IF) signals or direct current signals.

5. The system of claim 1, further comprising a switch to switch between multiple antennas of each BT core of the two BT cores of each dual-core BT receiver of the plurality of dual-core BT receivers.

6. The system of claim 1, wherein the first BT core and second BT core are configured to be powered by a same oscillator circuit.

7. The system of claim 1, wherein the two BT cores of each dual-core BT receiver of the plurality of dual-core BT receivers are configured to one of amplify or down-convert one of the first RF signal or the second RF signal.

8. The system of claim 1, wherein the respective antenna of the first BT core is further configured to be located a distance from the respective antenna of the second BT core based at least on an operating wavelength of each of the first RF signal or the second RF signal.

9. The system of claim 1, wherein the respective antenna of the first BT core and the respective antenna of the second BT core are configured to be on an axis having an angle with a line that is perpendicular to a direction of incoming travelling wave front.

10. A system comprising:

a plurality of beacon devices, each beacon device of the plurality of beacon devices installed at a respective location on a vehicle, each beacon device of the plurality of beacon devices comprising a Bluetooth (BT) dual-core, each Bluetooth (BT) core of the BT dual-core comprising a receiver and a transmitter coupled via a duplexer to a first radio-frequency (RF) antenna different from a second radio-frequency (RF) antenna of another core of the BT dual-core:

wherein a first radio-frequency (RF) antenna of a first BT core of the BT dual-core of each beacon device, is configured to receive, based at least on a packet transmitted from the transmitter of the first BT core to a communication device, a first RF signal, and a second RF antenna of a second BT core of the BT dual-core is configured to receive, based at least on the packet, a second RF signal;

wherein the first Bluetooth (BT) core of each beacon device is coupled to the first RF antenna and is configured to generate a second signal responsive to the first RF signal and the second BT core is coupled to the second RF antenna and is configured to generate a second signal responsive to the second RF signal;

a circuitry coupled to each of the first BT core and the second BT core of each BT dual-core of each beacon device and is configured to:

receive information identifying the respective location of each of the plurality of beacon devices;

receive the first signal from the first BT core and the second signal from the second BT core; and determine a location of the communication device based at least on the respective location of each of the plurality of beacon devices and based at least on one or more angle-of-arrivals of one or more BT packets from the communication device to each BT dual-core of each beacon device using a phase difference between the first signal of the first BT core and the second signal of the second BT core of each beacon device.

11. The system of claim 10, wherein the circuitry is part of a controller configured within the vehicle.

12. The system of claim 10, wherein the one or more beacon devices of the plurality of beacon devices is installed at the respective location on the vehicle comprising a corner of the vehicle.

13. The system of claim 10, wherein the circuitry is installed within the vehicle.

14. The system of claim 10, wherein the communication device is external to the vehicle.

15. The system of claim 10, wherein the circuitry is further configured to determine: (i) a first phase difference between the first signal and the second signal and (ii) the one or more angle-of-arrivals based at least on a second phase difference between the first signal and the second signal.

16. A device comprising:

a Bluetooth (BT) transceiver configured to receive a plurality of BT packets from a second device, the BT transceiver comprising at least two cores and each core of the at least two cores comprises a transmitter and a receiver coupled via a duplexer to a radio-frequency (RF) antenna; and a first BT core of the at least two cores of the BT transceiver is coupled to a first radio-frequency (RF) antenna and configured to generate based at least on one or more BT packets of the plurality of BT packets, a first signal responsive to a first RF signal of the first RF antenna for the one or more BT packets;

a second BT core of the at least two cores of the BT transceiver is coupled to a second RF antenna that is located a distance from the first RF antenna and configured to generate based at least on the one or more of the plurality of BT packets, a first signal responsive to a second RF signal of the second RF antenna for the one or more BT packets; and a processor, coupled to each of the first BT core and the second BT core of the BT transceiver, configured to determine an angle-of-arrival of the one or more BT packets using a phase difference between the first signal and the second signal from the first BT core and the second BT core and the distance between the first RF antenna and the second RF antenna.

17. The device of claim 16, wherein the distance between the first RF antenna and the second RF antenna is selected to be equal to half of a wavelength of one of the first RF signal or the second RF signal.

18. The device of claim 16, wherein the processor is further configured to compute the phase difference using maximal ratio combining (MRC) of the first signal and the second signal, and to measure a time-of-arrival difference between the first signal and the second signal based on the phase difference.

19. The device of claim 18, wherein the first BT core and the second BT core are configured to be powered by a same oscillator circuit.

20. The device of claim 16, wherein the device is an electronic device used by one or more consumers.

* * * * *